US008079445B2

(12) United States Patent
Aoyama et al.

(10) Patent No.: US 8,079,445 B2
(45) Date of Patent: Dec. 20, 2011

(54) TRANSMISSION

(75) Inventors: Hideki Aoyama, Toyoake (JP);
Yasuhiro Sawaki, Nagoya (JP); Hisashi Kawai, Nagoya (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 1081 days.

(21) Appl. No.: 11/623,567

(22) Filed: Jan. 16, 2007

(65) Prior Publication Data
US 2007/0175728 A1    Aug. 2, 2007

(30) Foreign Application Priority Data

Jan. 30, 2006    (JP) .................. 2006-021558

(51) Int. Cl.
*F16H 57/04*    (2010.01)
*F16N 7/26*    (2006.01)
*F01M 1/04*    (2006.01)
(52) U.S. Cl. .................. 184/6.12; 184/6.5; 184/11.1
(58) Field of Classification Search .................. 184/6.5, 184/6.12, 11.1; 192/53.54
See application file for complete search history.

(56) References Cited

U.S. PATENT DOCUMENTS

| 2,046,957 | A | * | 7/1936 | Manville ............ 192/53.34 |
| 4,242,923 | A | * | 1/1981 | Nishikawa et al. ............ 475/160 |
| 6,223,858 | B1 | * | 5/2001 | Ubagai et al. ............ 184/11.2 |
| 2003/0183029 | A1 | | 10/2003 | Shimaguchi |
| 2003/0196510 | A1 | | 10/2003 | Fegg |
| 2004/0104074 | A1 | * | 6/2004 | Nakai et al. ............ 184/6.5 |
| 2006/0054410 | A1 | | 3/2006 | Nakamura et al. |

FOREIGN PATENT DOCUMENTS

| JP | 10-299876 A | 11/1998 |
| JP | 11-118029 A | 4/1999 |
| JP | 3035997 | 2/2000 |

OTHER PUBLICATIONS

Extended European Search Report dated Jan. 26, 2011 for the corresponding European Application No. 07001317.2.

* cited by examiner

*Primary Examiner* — Michael Mansen
*Assistant Examiner* — Robert Reese
(74) *Attorney, Agent, or Firm* — Global IP Counselors, LLP

(57) ABSTRACT

A transmission has a rotating shaft, a coupling sleeve fixedly coupled to the rotating shaft to rotate with the rotating shaft and a variable speed gear mounted on the rotating shaft. The variable speed gear is configured to rotate on the rotating shaft when a clutch gear that is embedded in a side surface of the variable speed gear is disengaged from the coupling sleeve and to be fixed to the rotating shaft when the clutch gear is engaged from the coupling sleeve. The coupling sleeve is moved in the axial direction between the engaged and disengaged states by a shifting fork F3. A lubricant supplying structure directs lubricant to the clutch gear by diverting the lubricant against a side surface of the shifting fork that faces the clutch gear and a side surface of the coupling sleeve that faces the clutch gear.

15 Claims, 9 Drawing Sheets

TRANSMISSION

CROSS-REFERENCE TO RELATED APPLICATIONS

This application claims priority to Japanese Patent Application No. 2006-021558, filed on Jan. 30, 2006. The entire disclosure of Japanese Patent Application No. 2006-021558 is hereby incorporated herein by reference.

BACKGROUND OF THE INVENTION

1. Field of the Invention

The present invention relates to a transmission. More specifically, the present invention relates to a transmission in which a clutch gear is disposed in such a way as to be embedded in a side surface of a variable speed gear that rotates freely on a rotating shaft.

2. Background Information

Various types of transmissions are presently known. One example of a conventional variable speed transmission is disclosed in Japanese Unexamined Patent Application Publication No. 3035997. In this type of conventional transmission, a variable speed transmission is provided with a rotating shaft having a variable speed gear mounted on the rotating shaft to be selectively coupled either in a fixed state or a freely rotatable state. In particular, a coupling sleeve is provided on the rotating shaft with the coupling sleeve being moved in an axial direction into meshing engagement with a clutch gear that is embedded in a variable speed gear so that the variable speed gear rotates with the rotating shaft. When the coupling sleeve is disengaged from the clutch gear, the variable speed gear rotates freely on the rotating shaft. With this type of conventional transmission, the overall axial length of the transmission is shortened as a result of the clutch gear being embedded in the side surface of the variable speed gear.

In view of the above, it will be apparent to those skilled in the art from this disclosure that there exists a need for an improved transmission. This invention addresses this need in the art as well as other needs, which will become apparent to those skilled in the art from this disclosure.

SUMMARY OF THE INVENTION

Incidentally, it has been determined that with such a transmission, in order to perform lubrication of parts requiring lubrication, such as the meshing surfaces between the variable speed gears and the meshing surfaces between the coupling sleeve and the clutch gear, there is a need to supply the lubricant. As a structure for supplying the lubricant to these parts requiring lubrication, feeding from an oil gutter is widely known, but when the coupling sleeve and the clutch gear are meshed in the transmission, if one simply feeds from an oil gutter, on certain occasions it may not be possible to supply sufficient lubricant to the clutch gear.

One of the aims of the transmission of the present invention is to consistently supply lubricant to the clutch gear in a transmission where the clutch gear is embedded in the side surface of a variable speed gear. Furthermore, another of the aims of transmission of the present invention is to supply lubricant to the meshing surfaces of the variable speed gears. Additionally, another of the aims of transmission of the present invention is to more simply maintain the lubricity of the clutch gear embedded in the side surface of the variable speed gear.

In accordance with one aspect of the present invention, a transmission is provided that basically comprises a rotating shaft, a coupling sleeve, a variable speed gear, a clutch gear, a shifting fork and a lubricant supplying structure. The coupling sleeve is fixedly coupled to the rotating shaft to rotate with the rotating shaft. The variable speed gear is mounted on the rotating shaft to selectively rotate on the rotating shaft. The clutch gear is embedded in a side surface of the variable speed gear to selectively engage the coupling sleeve. The shifting fork is operatively engagable with an outer peripheral area of the coupling sleeve to move the coupling sleeve in an axial direction of the rotating shaft to selectively engage the coupling sleeve with the clutch gear. The lubricant supplying structure is configured and arranged to direct lubricant to the clutch gear by diverting the lubricant against a side surface of the shifting fork that faces the clutch gear and the coupling sleeve.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
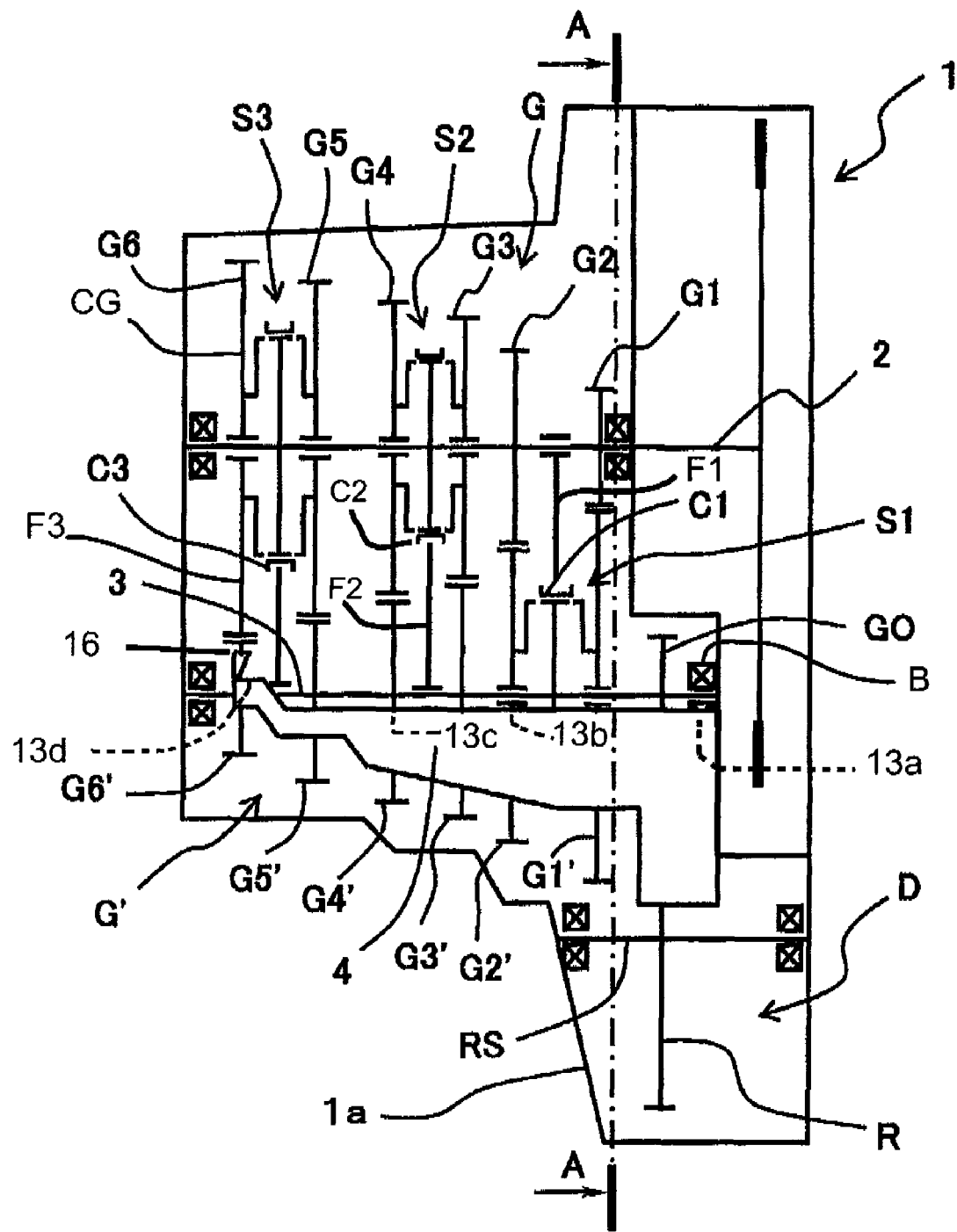
FIG. 1 is a simplified schematic longitudinal cross sectional view, as seen from above, of one example of a variable speed ratio transmission in accordance with a first embodiment of the present invention.
Figure 2:
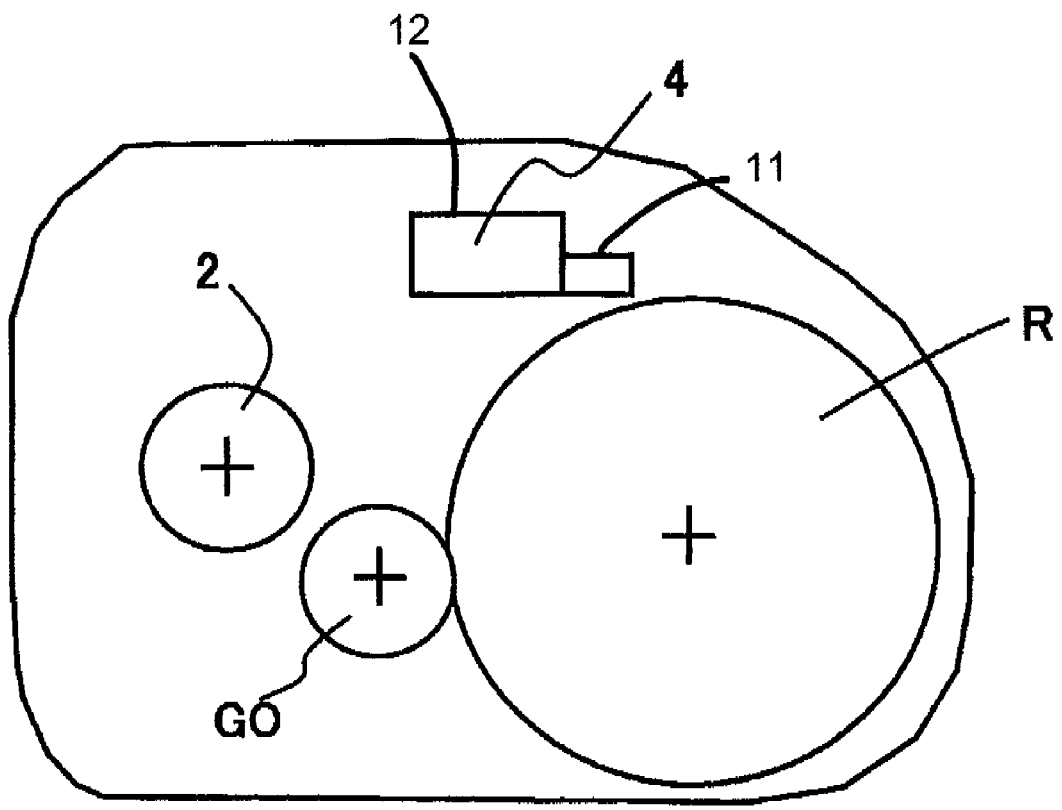
FIG. 2 is a simplified schematic transverse cross sectional view as viewed along section line A-A of the transmission in FIG. 1.

Referring initially to FIG. 1, a variable speed ratio transmission 1 is illustrated cross section with a lubricant supplying structure in accordance with a first embodiment of the present invention. As shown in FIGS. 1 and 2, the transmission 1 of this first embodiment basically includes an input axle 2 (rotating shaft), an output axle 3 (rotating shaft) and an oil gutter 4 in accordance with the present invention. The input axle 2 has a drive gear train G attached thereto. The output axle 3 has a driven gear train G' and an output gear GO attached thereto. The output gear GO meshes with the drive ring gear R. A differential D has a ring gear R that meshes with the output gear GO. The oil gutter 4 is attached to a point located at an upper portion of the transmission case 1a above the drive gear train G, the output gear GO and the differential D. The oil gutter 4 receives lubricant from the bottom of the case 1a by the rotation of the ring gear R that scoops up lubricant and propels the lubricant into the oil gutter 4. Preferably, as viewed from a top view in FIG. 1, the oil gutter 4 is located at a point somewhere between the output axle 3 and a rotating shaft RS of the ring gear R. All of these parts are contained within transmission case 1a.

The drive gear train G basically includes a $1^{st}$ speed drive gear G1, a $2^{nd}$ speed drive gear G2, a $3^{rd}$ speed drive gear G3, a $4^{th}$ speed drive gear G4, a $5^{th}$ speed drive gear G5 and a $6^{th}$ speed drive gear G6. The drive gears G1 to G6 are attached in order from the front edge to the rear edge of transmission case 1a, which is on the clutch side, not shown in the figures. The $1^{st}$ speed drive gear G1 and the $2^{nd}$ speed drive gear G2 are configured as fixed gears, while the $3^{rd}$ speed drive gear G3, the $4^{th}$ speed drive gear G4, the $5^{th}$ speed drive gear G5 and the $6^{th}$ speed drive gear G6 are configured as freely rotating gears. Also, a $3^{rd}$-$4^{th}$ speed synchronizer S2 is fixed to the input axle 2 between the $3^{rd}$ speed drive gear G3 and the $4^{th}$ speed drive gear G4. A $5^{th}$-$6^{th}$ speed synchronizer S3 is fixed to the input axle 2 between the $5^{th}$ speed drive gear G5 and the $6^{th}$ speed drive gear G6. The $6^{th}$ speed drive gear G6 has a $6^{th}$ speed clutch gear CG that is embedded in a side surface that faces the $5^{th}$-$6^{th}$ speed synchronizer S3. Thus, the $6^{th}$ speed drive gear G6 is a variable speed gear with a clutch gear embedded in its side surface.

Referring now to the output axle 3, the output gear GO is fixed to a foremost part of the output axle 3, which is the clutch side not shown in the figures. The driven gear train G' basically includes a $1^{st}$ speed driven gear G1', a $2^{nd}$ speed driven gear G2', a 3rd speed driven gear G3', a $4^{th}$ speed driven gear G4', a $5^{th}$ speed driven gear G5' and a $6^{th}$ speed driven gear G6'. The driven gear train G' meshes with the drive gear train G. In particular, the driven gears G1' to G6' mesh with the drive gears G1 to G6, respectively. Thus, the driven gears G1' to G6' are attached to the output axle 3 at locations corresponding to the drive gears G1 to G6, respectively, that are attached to the input axle 2. The $1^{st}$ speed driven gear G1' and the $2^{nd}$ speed driven gear G2' are configured as freely rotating gears, while the $3^{rd}$ speed driven gear G3', the $4^{th}$ speed driven gear G4', the $5^{th}$ speed driven gear G5' and the $6^{th}$ speed driven gear G6' are configured as fixed gears. Also, $1^{st}$-$2^{nd}$ speed synchronizer S1 is fixed between the $1^{st}$ speed driven gear G1' and the $2^{nd}$ speed driven gear G2'.

Figure 5:
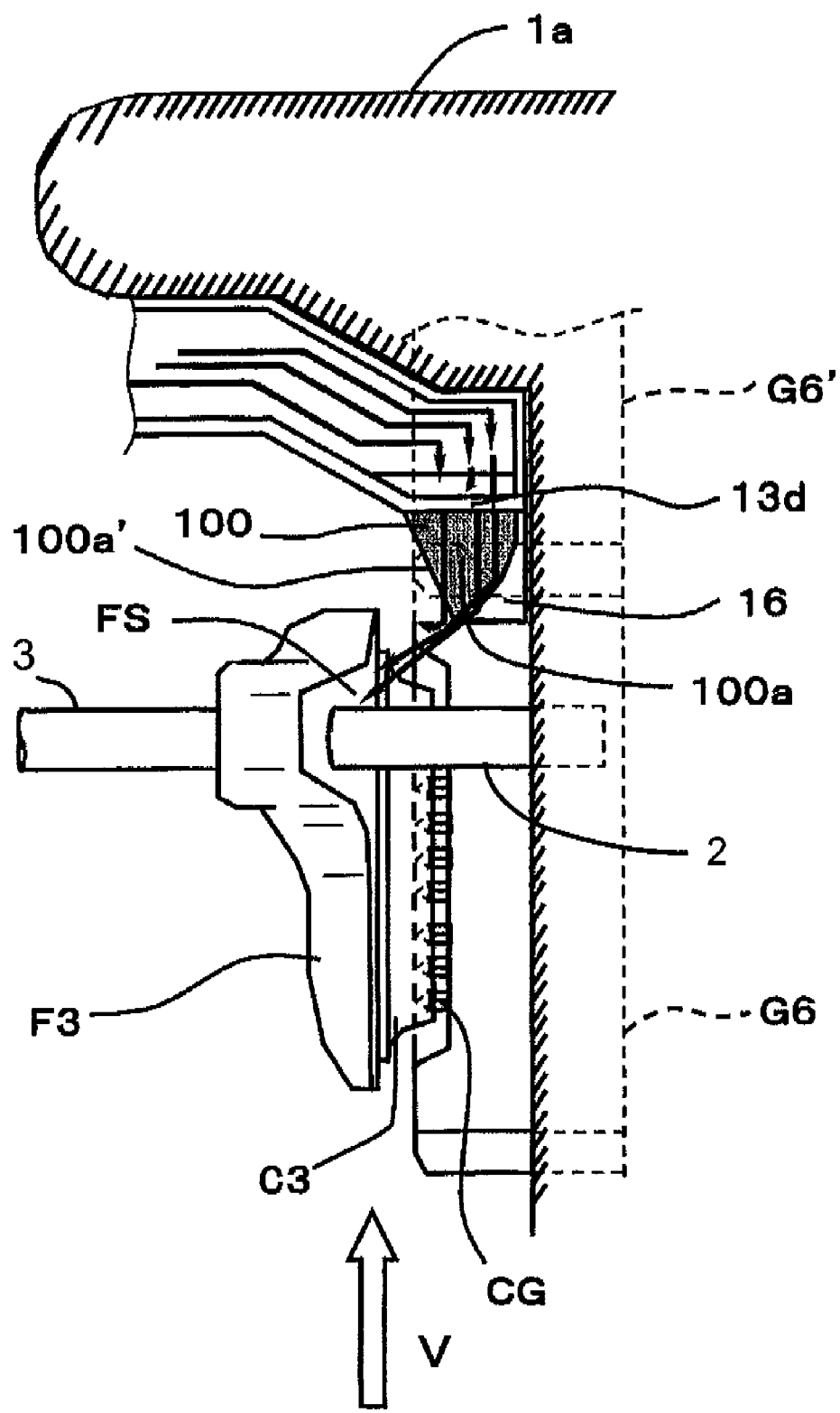
FIG. 5 is an enlarged simplified schematic top view of the downstream edge of the guide path, seen from above.

The synchronizer S1 includes a coupling sleeve C1 and a shifting fork F1. The coupling sleeve C1 is configured and arranged to slide in the axial direction along the output shaft 3 by activation of the shifting fork F1. Similarly, the synchronizer S2 includes a coupling sleeve C2 and a shifting fork F2, and the synchronizer S3 includes a coupling sleeve C3 and a shifting fork F3. The coupling sleeve C2 is configured and arranged to slide in the axial direction along the input shaft 2 by activation of the shifting fork F2, while the coupling sleeve C3 is configured and arranged to slide in the axial direction along the input shaft 2 by activation of the shifting fork F3. As illustrated in FIG. 5, the coupling sleeve C3 has a plurality of splines or teeth (shown in broken lines) formed on an inner peripheral surface. The splines or teeth of the coupling sleeve C3 selectively engage a plurality of splines or teeth on the $6^{th}$ speed clutch gear CG so that the $6^{th}$ speed drive gear G6 selectively rotates with the input shaft 2 when the coupling sleeve C3 is move into engagement with the $6^{th}$ speed clutch gear CG by the shifting fork F3. When the coupling sleeve C3 is disengagement from the $6^{th}$ speed clutch gear CG, the $6^{th}$ speed clutch gear CG rotates freely about the input shaft 2. The synchronizers S1, S2 and S3 have similar structures.

The differential D is a conventional differential device that transmits power for automatically permitting a variance in the number of rotations of the left and right wheels. The differential D is attached to the forward side of transmission case 1a with the ring gear R of the differential D meshing with the output gear GO.

Figure 3:
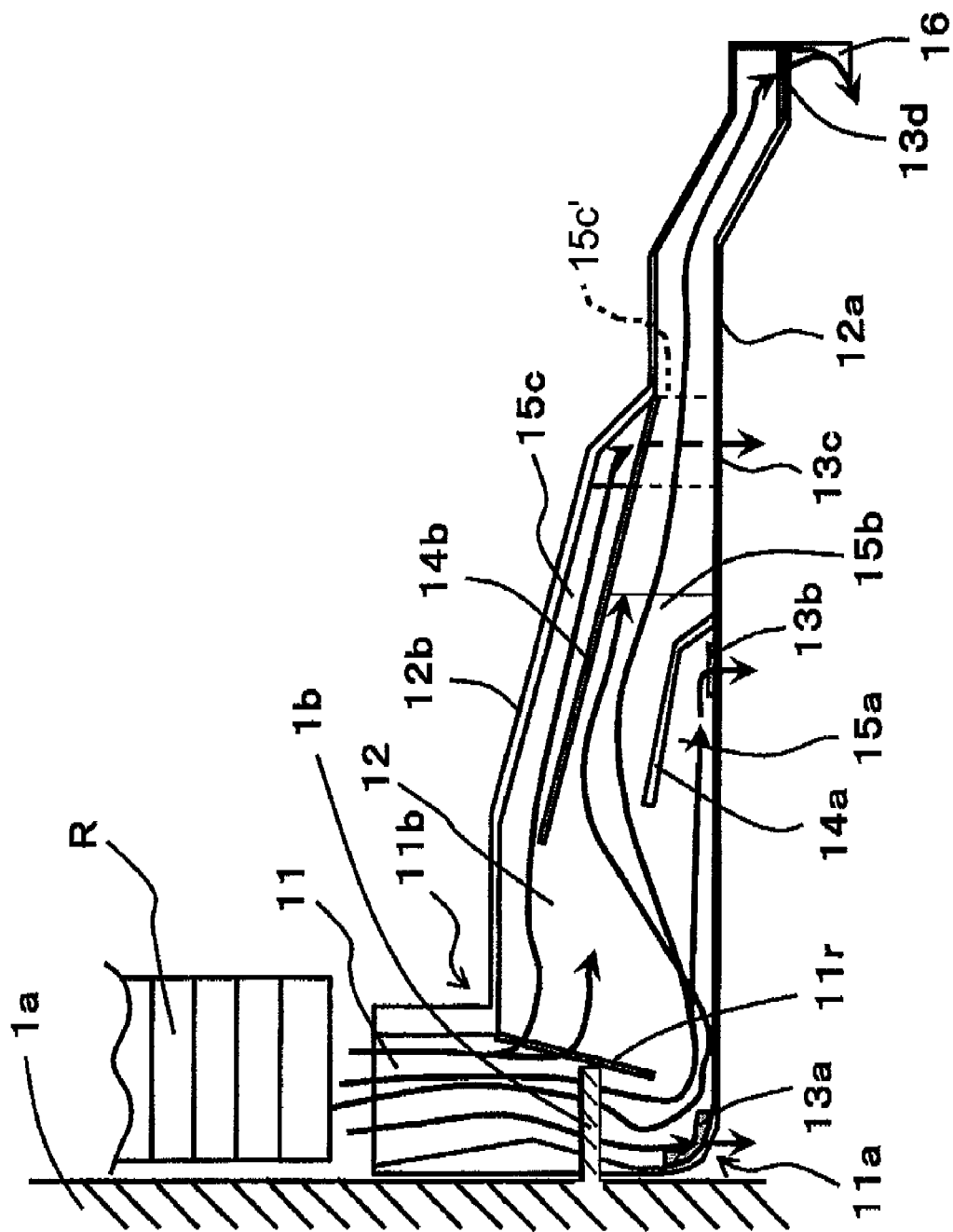
FIG. 3 is a simplified schematic top view of a portion of the transmission 1 for showing the top exterior appearance of an oil gutter of the transmission illustrated in FIGS. 1 and 2 in accordance with the first embodiment of the present invention.
Figure 4:
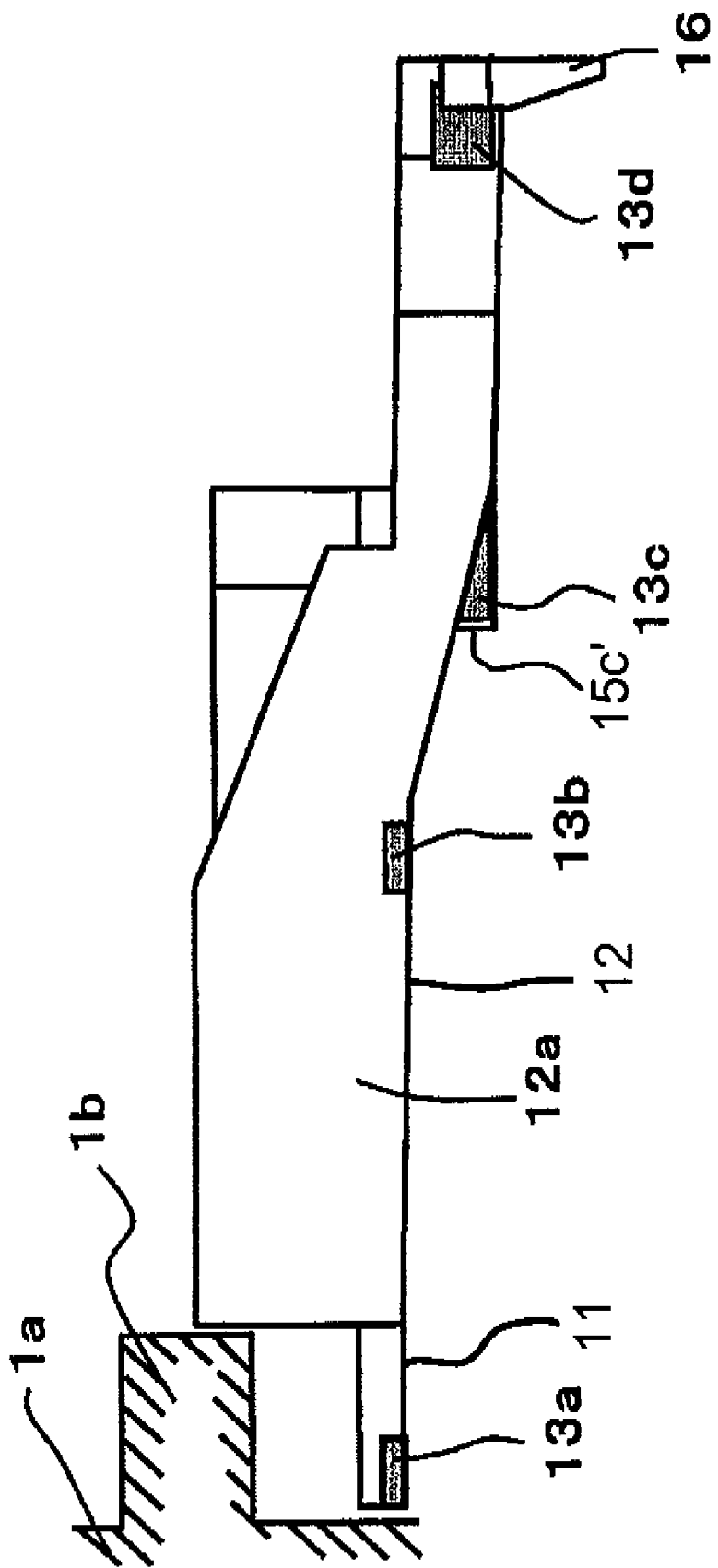
FIG. 4 is a simplified schematic side elevational view of a portion of the transmission 1 for showing the side exterior appearance of the oil gutter 4.

FIG. 3 is a simplified schematic top view of a portion of the transmission 1 for showing the top exterior appearance of the oil gutter 4, while FIG. 4 is a simplified schematic side elevational view of the portion of the transmission 1 for showing the side exterior appearance of the oil gutter 4. As shown in FIG. 3, the oil gutter 4 basically has an oil inlet part 11 and an oil channel 12. The oil inlet part 11 is configured and arranged relative to the ring gear R to receive the lubricant scooped from the ring gear R. The oil channel 12 is configured and arranged relative to the oil inlet part 11 such that the oil channel 12 causes the flow of the received the lubricant to change direction at almost a right angle so as to flow in the axial direction of the transmission 1.

As shown in FIGS. 3 and 4, an oil spill prevention rib 1b is formed at a point located in the upper portion of the transmission case 1a above the oil inlet part 11. The oil spill prevention rib 1b is configured to be able to aim the lubricant scooped from the ring gear R at the oil spill prevention rib 1b and guide it to the oil inlet part 11. Thus, the oil spill prevention rib 1b acts as a guiding member that directs or guides lubricant scooped up due to the rotating of the ring gear R toward the oil gutter 4, without fail.

The oil inlet part 11 has an outer corner 11a and an inner corner 11b formed where the oil inlet part 11 interconnects with the oil channel 12. The oil inlet part 11 also has an oil guide rib 11r extending from the inner corner 11b towards the outer corner 11a. The outer corner 11a has an opening 13a acts as a supply port for feeding the lubricant in a direction of an output axle bearing B, which support the output axle 3 for rotation with respect to transmission case 1a. The oil guide rib 11r is positioned on the lower wall of the oil inlet part 11 to guide the lubricant from the inner corner 11b to the opening 13a. In other words, the oil guide rib 11r guides the lubricant from the inner corner 11b across the oil channel 12 to the opening 13a. The length of the oil guide rib 11r is configured to be about half the length of a diagonal line connecting the outer corner 11a and the inner corner 11b or slightly shorter than length of a diagonal line connecting the outer corner 11a and the inner corner 11b as shown in FIG. 3.

The oil channel 12 has a pair of side wall 12a and 12b for funneling the lubricant from the ring gear R towards the opposite axial end of the transmission 1. In particular, the oil channel 12 is configured and arranged to become more narrow as the oil channel 12 approaches the $6^{th}$ speed drive gear G6 and the $6^{th}$ speed driven gear G6' from the $1^{st}$ speed drive gear G1 and the $1^{st}$ speed driven gear G1'. In other words, the further downstream oil channel 12 extends, the width of that the oil channel 12 becomes narrower. Moreover, the oil channel 12 is formed at an incline, so that the height and location of its lower surface becomes lower in the downstream direction. In this case, it is possible to increase the flow speed of the lubricant in the downstream direction of the oil channel 12. As a result, it is possible to supply the lubricant, without fail, as far as the downstream point in the oil gutter 4. The side wall 12a of the oil channel 12 has an oil opening 13b that faces towards the input axle 2. The oil opening 13b acts as a supply port for feeding the lubricant in the direction of the meshing surfaces between the $2^{nd}$ speed drive gear G2 and the $2^{nd}$ speed driven gear G2', and the meshing surfaces between the $3^{rd}$ speed drive gear G3 and the $3^{rd}$ speed driven gear G3'. The side wall 12a of the oil channel 12 also has with an oil opening 13c that acts as a supply port for feeding the lubricant in the direction of the meshing surfaces between the $4^{th}$ speed drive gear G4 and the $4^{th}$ speed driven gear G4', and the meshing surfaces between the $5^{th}$ speed drive gear G5 and the $5^{th}$ speed driven gear G5'. The side wall 12a of the oil channel 12 is further provided with an oil opening 13d that faces towards the input axle 2. The oil opening 13d acts as a supply port for feeding the lubricant in the direction of the meshing surfaces between the $6^{th}$ speed drive gear G6 and the $6^{th}$ speed driven gear G6'. The oil channel 12 is further provided with a pair of guide walls 14a and 14b for guiding the lubricant along the lower wall of the oil channel 12 to each of the openings 13b, 13c and 13d.

The guide wall 14a is attached to the near side of the side wall 12a of the oil channel 12. The guide wall 14a and the side wall 12a form a guide path 15a for guiding the lubricant to the oil opening 13b. The guide wall 14b is attached to the side wall 12b, which is on the opposite side of the side wall 12a of the oil channel 12. The guide walls 14a and 14b form a guide path 15b for guiding the lubricant to the oil opening 13d. The guide wall 14b and the side wall 12b form a guide path 15c for guiding the lubricant to the oil opening 13c. In other words, the two guide walls 14a and 14b divide the oil channel 12 into three channels (i.e., the paths 15a to 15c).

The oil channel 12 has a communicating part 15c' formed on its lower wall, passing below the lower part of guide path 15b and connected to the oil opening 13c in the side wall 12a. Thus, the communicating part 15c' fluidly connects the guide path 15c to the oil opening 13c. In other words, the oil channel 12 is configured so that it is possible for the lubricant that flows along the guide path 15c, which is formed in this way on the near side of the side wall 12b, and then to be guided to the oil opening 13c, which is formed on the side wall 12a. Also, the oil channel 12 has a protrusion 16 formed at its end that is opposite to the oil inlet part 11. This protrusion 16 extends from the side wall 12a at the downstream edge of the guide path 15b where the oil opening 13d is formed. The protrusion 16 protrudes at a right angle to the axial direction of the transmission 1. Preferably, the oil inlet part 11, the oil channel 12 and the protrusion 16 are formed as a single unit.

Figure 6:
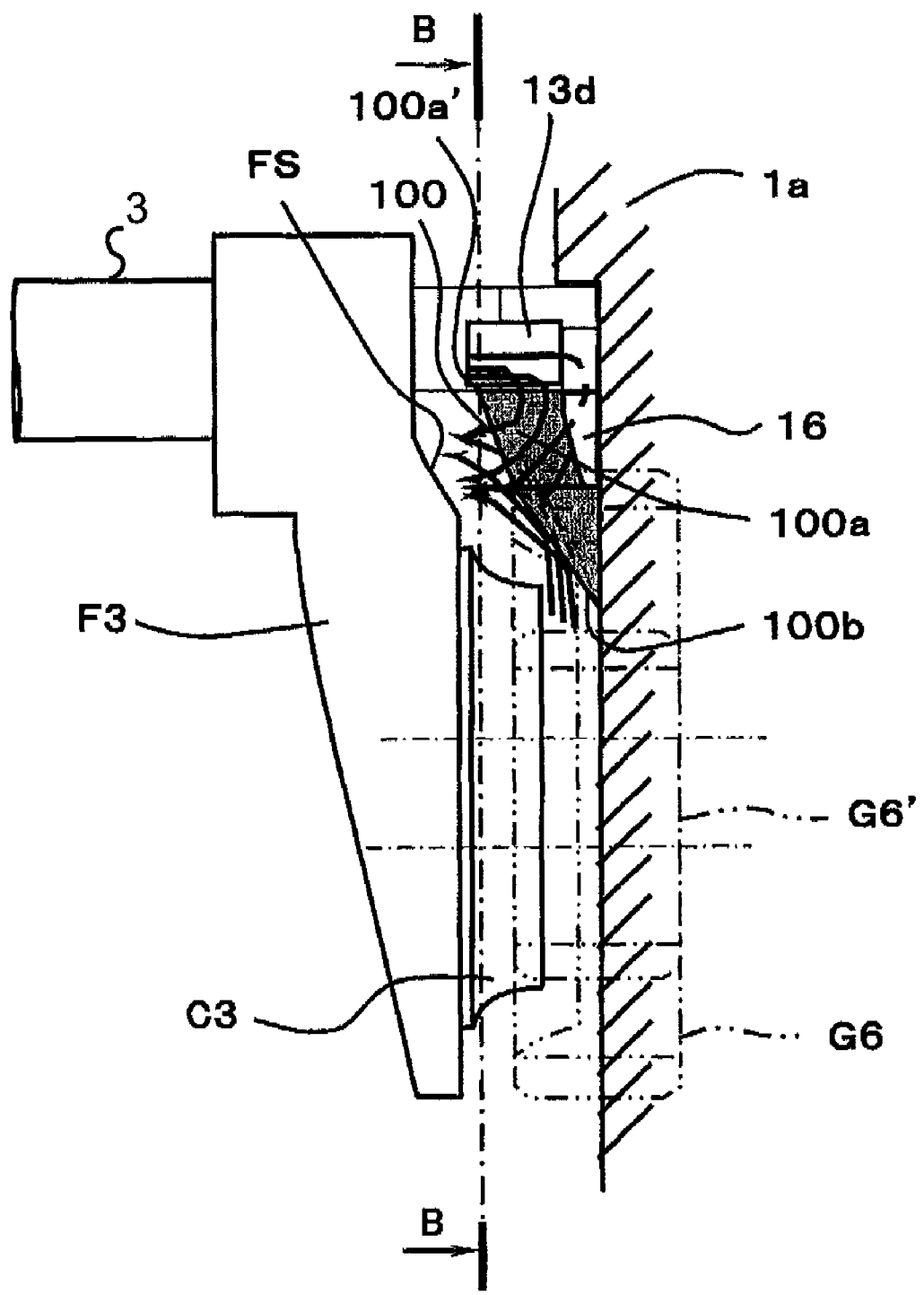
FIG. 6 is a simplified schematic side elevational view of the downstream edge of the guide path as seen from direction of arrow V in FIG. 5.
Figure 7:
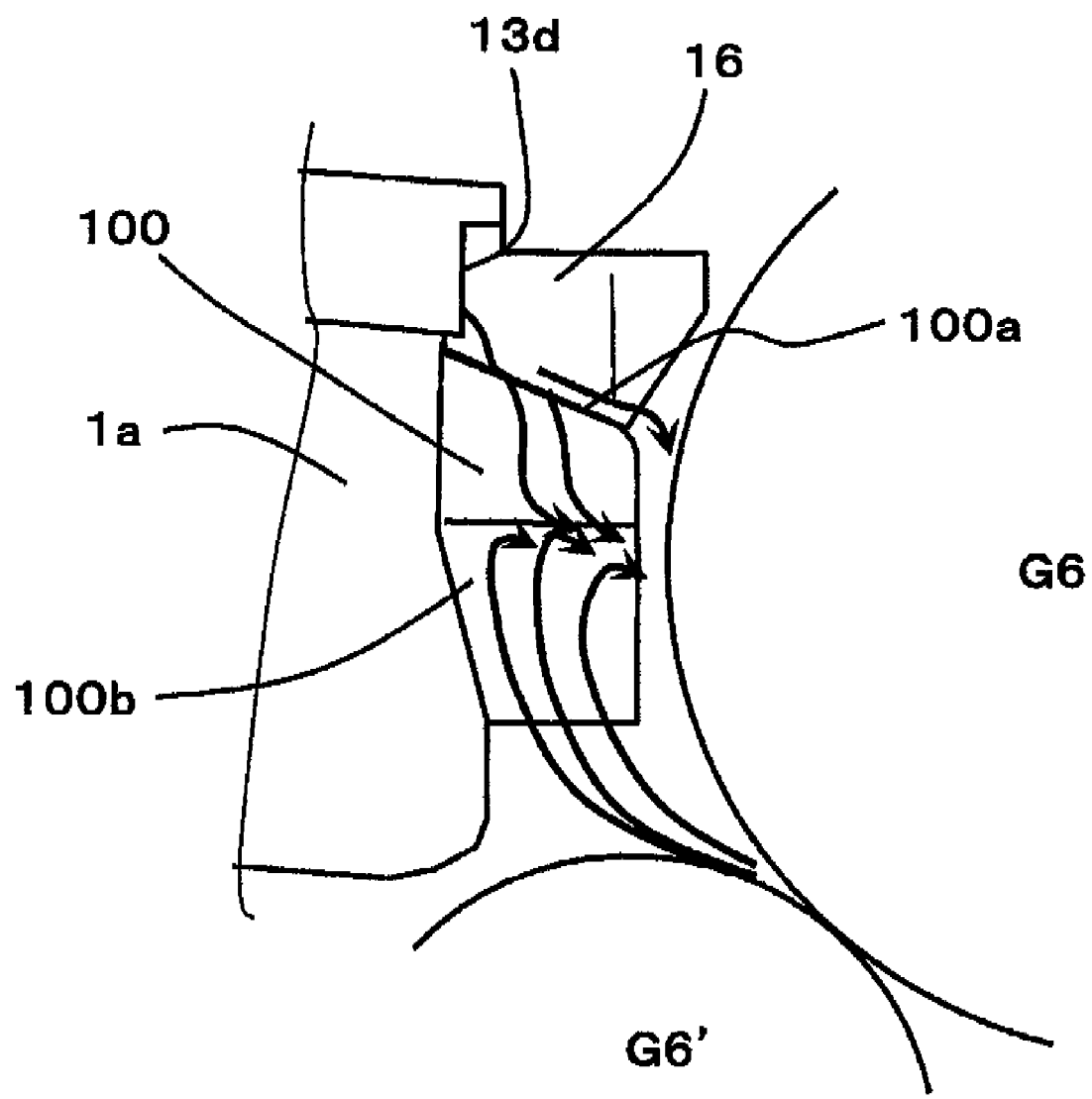
FIG. 7 is a simplified schematic cross sectional view of the downstream edge of the guide path as viewed along section line B-B of FIG. 6.

FIG. 5 is an enlarged simplified schematic top view showing the downstream edge of the guide path 15c as elevational viewed from above, while FIG. 6 is a side elevational view of the downstream edge of the guide path as seen from direction of arrow V in FIG. 5. FIG. 7 is a simplified schematic cross sectional view of the downstream edge of the guide path as viewed along section line B-B of FIG. 6. As shown in FIGS. 5 to 7, the protrusion 16 is attached to the transmission case 1a by an oil diverting part 100. The oil diverting part 100 extends from the transmission case 1a to a location adjacent to the meshing surfaces of the $6^{th}$ speed drive gear G6 and the $6^{th}$ speed driven gear G6'. The protrusion 16 is configured so that a portion of the lubricant fed from the opening 13d is deflected in a smooth curve toward a side surface FS side of the shifting fork F3. The lubricant deflected toward the side surface FS of the shifting fork F3 by the protrusion 16 hits the side surface FS of the shifting fork F3, and then streams down the side surface FS. The lubricant then spills from the side surface FS of the shifting fork F3 onto an outer peripheral area (outer corner surface) of the coupling sleeve C3, where the lubricant streams down from the outer peripheral area (outer corner surface) of the coupling sleeve C3 to direct the lubricant to the $6^{th}$ speed clutch gear CG that is embedded in the side surface of the $6^{th}$ speed drive gear G6. As seen in FIG. 6, the coupling sleeve C3 includes a tapered section (outer corner surface) having a smooth curve with a radius that becomes smaller as the coupling sleeve C3 approaches an end portion of the outer peripheral surface of the coupling sleeve C3 that faces the clutch gear CG.

As seen in FIGS. 5 to 7, the oil diverting part 100 has a first inclined portion with an inclined surface 100a and a second inclined portion with an inclined surface 100b. The protrusion 16 constitutes a first orientation or diverting member that is next to the inclined surface 100a, while the second inclined portion with an inclined surface 100b constitutes a second orientation or diverting member. In other words, the inclined surface 100a is formed so that it is possible to make the lubricant, which is fed from the opening 13d, rapidly flow downward to the meshing surface of the $6^{th}$ speed drive gear G6 and the $6^{th}$ speed driven gear G6'. The inclined surface 100b of the second orientation or diverting member acts as a guiding member that directs or guides lubricant scooped up due to the rotating of the variable speed gear G6 toward the side surface of the shifting fork FS such that the lubrication of the $6^{th}$ speed clutch gear CG is further improved.

The protrusion 16 of the oil channel 12 is preferably attached to the first inclined portion with the inclined surface 100a, while the second inclined portion with the inclined surface 100b is preferably a part of the wall of the transmission case 1a. As best seen in FIG. 7, the inclined surface 100a extends downwardly so as to direct the lubricant from the oil channel 12 towards the meshing surface of the $6^{th}$ speed drive gear G6 and the $6^{th}$ speed driven gear G6', while the inclined surface 100b so as to direct the lubricant from the rotation of the variable speed gear G6 towards the side surface of the shifting fork FS. In this case it is possible to more efficiently supply the lubricant to the side surface of the shifting fork FS. As a result, it is possible to ensure more definitely that the $6^{th}$ speed clutch gear CG will be lubricated.

As best seen in FIG. 6, the inclined surface 100b extends from the inclined surface 100a so as to be vertically and horizontally inclined with respect to a horizontal plane for directing the lubricant against the side surface FS of the shifting fork F3. The inclined surface 100b is also formed so that the lubricant that splashes from the meshing surfaces of the $6^{th}$ speed drive gear G6 and the $6^{th}$ speed driven gear G6' is oriented toward the side surface FS of the shifting fork F3. Accordingly, the inclined surface 100a is formed so that it is possible to make the lubricant, which is fed from the oil opening 13d, flow rapidly downward towards the meshing surface of the $6^{th}$ speed drive gear G6 and the $6^{th}$ speed driven gear G6', while the inclined surface 100a is formed so that it is possible to make the lubricant, which is splashed up from the meshing surfaces of the $6^{th}$ speed drive gear G6 and the $6^{th}$ speed driven gear G6', flow upwardly towards the side surface FS of the shifting fork F3. The lubricant that is oriented toward the side surface FS of the shifting fork F3 by the inclined surface 100b assists the lubricant that is oriented toward side surface FS of the shifting fork F3 by the protrusion 16, and the lubricant that spills from edge surface 100a' of side surface FS of the shifting fork F3 of the inclined surface 100a in reaching side surface FS of the shifting fork F3. In other words, as shown in FIGS. 5 and 6, a lubricant guiding surface, which is formed by a surface of the protrusion 16, the inclined surface 100a and the inclined surface 100b, at least partially overlaps the shifting fork F3 when viewed in the axial direction.

Next, the lubricating operation of the lubricant supplying structure of the transmission 1 of this first embodiment will be explained. In particular, the lubricant flow to the $6^{th}$ speed clutch gear CG by the oil gutter 4 will now be explained.

The lubricant is scooped up from the bottom area of the transmission 1 by the rotation of the ring gear R of the differential D. Thus, the rotation of the ring gear R conveys the lubricant to the oil inlet part 11 of the oil gutter 4. For example, the lubricant on the ring gear R is propelled by the rotation of the ring gear R to hit the oil spill prevention rib 1b. Accordingly, a part of the lubricant that is received in the oil inlet part 11 is directed to the oil opening 13a by the guide rib 11r. The lubricant exiting from the oil opening 13a is supplied to the bearing B, which supports one end of the output axle 3 to rotate in the transmission case 1a. The remaining the lubricant flows into the oil channel 12 and then directed into the oil opening 13b, 13c and 13d by the guide paths 15a, 15b and 15c.

The lubricant fed from the oil opening 13b is supplied to the meshing surfaces between the $2^{nd}$ speed drive gear G2 and the $2^{nd}$ speed driven gear G2' and the meshing surfaces between the $3^{rd}$ speed drive gear G3 and the $3^{rd}$ speed driven gear G3'. The lubricant fed from the oil opening 13c is supplied to the meshing surfaces between the $4^{th}$ speed drive gear G4 and the $4^{th}$ speed driven gear G4', and the meshing surfaces between the $5^{th}$ speed drive gear G5 and the $5^{th}$ speed driven gear G5'.

The lubricant fed from opening 13d is supplied to the meshing surfaces between the $6^{th}$ speed drive gear G6 and the $6^{th}$ speed driven gear G6' by the inclined surface 100a, along with which, a part of the lubricant is directed to the side surface FS of the shifting fork F3 by the protrusion 16. In particular, the part of the lubricant that is directed by the protrusion 16 to the side surface FS of the shifting fork F3 hits the side surface FS, and then streams down on the outer corner surface of the coupling sleeve C3. The lubricant then flows from the outer corner surface of the coupling sleeve C3 to the $6^{th}$ speed clutch gear CG, which is embedded in the side surface of the $6^{th}$ speed drive gear G6. At this time, some of the lubricant at the meshing surfaces between the $6^{th}$ speed drive gear G6 and the $6^{th}$ speed driven gear G6' splashes against the inclined surface 100b where the lubricant is then directed to the side surface FS of the shifting fork F3. This arrangement assists the lubricant that is oriented toward the side surface FS of the shifting fork F3 by the protrusion 16, and the lubricant that spills from the edge surface 100a' of the side surface FS of the shifting fork F3 of the inclined surface 100a in reaching the side surface FS of the shifting fork F3. Accordingly, the lubricant is able to be efficiently supplied to the $6^{th}$ speed clutch gear CG.

According to the transmission 1 of the first embodiment, as explained above, since a part of the lubricant fed from the oil opening 13d by the protrusion 16, which is formed in the oil gutter 4, is directed to the side surface FS of the shifting fork F3 and hits the side surface FS, and the lubricant that hits it is made to flow from the outer corner surface of the coupling sleeve C3 into the $6^{th}$ speed clutch gear CG through the side surface FS, it is possible to ensure more definitely that the lubricant is supplied to the $6^{th}$ speed clutch gear CG, which is embedded in side surface of the $6^{th}$ speed drive gear G6. Additionally, the lubricant that flows down through the inclined surface 100a without contacting the protrusion 16 is supplied to the meshing surfaces the $6^{th}$ speed drive gear G6 and the $6^{th}$ speed driven gear G6'.

Also, according to the transmission 1 of the first embodiment, because the lubricant splashed from the meshing surfaces between the $6^{th}$ speed drive gear G6 and the $6^{th}$ speed driven gear G6' is directed to the side surface FS of the shifting fork F3 by the inclined surface 100b of the oil diverting part 100, which is formed in transmission case 1a, and assists the lubricant that is oriented toward side surface FS of the shifting fork F3 by protrusion 16, and the lubricant that spills from edge surface 100a' of side surface FS of the shifting fork F3 of the inclined surface 100a in reaching side surface FS of the shifting fork F3, the lubricant is able to be efficiently supplied to the $6^{th}$ speed clutch gear CG.

Furthermore, according to the transmission 1 in the first embodiment, because the lubricant is only oriented to the side surface FS of the shifting fork F3 by using the protrusion 16, it is easier to maintain lubrication of the $6^{th}$ speed drive gear G6, which is embedded in the side surface of the $6^{th}$ speed clutch gear CG.

With the transmission 1 of the present invention, since the lubricant is supplied to the clutch gear CG using the side surface of the shifting fork F3 and the coupling sleeve C3 on the clutch gear side of the shifting fork F3, even if the clutch gear CG is embedded in the side surface of the variable speed gear G6, it is possible to supply, without fail, the lubricant to the clutch gear CG via the side surface of the shifting fork F3 and the coupling sleeve C3. Moreover, with such a transmission as the one in the present invention, it is possible for the lubricant supplying structure to lubricate the clutch gear CG, using a part of the lubricant that lubricates the meshing surfaces of the variable speed gear G6.

SECOND EMBODIMENT

Figure 8:
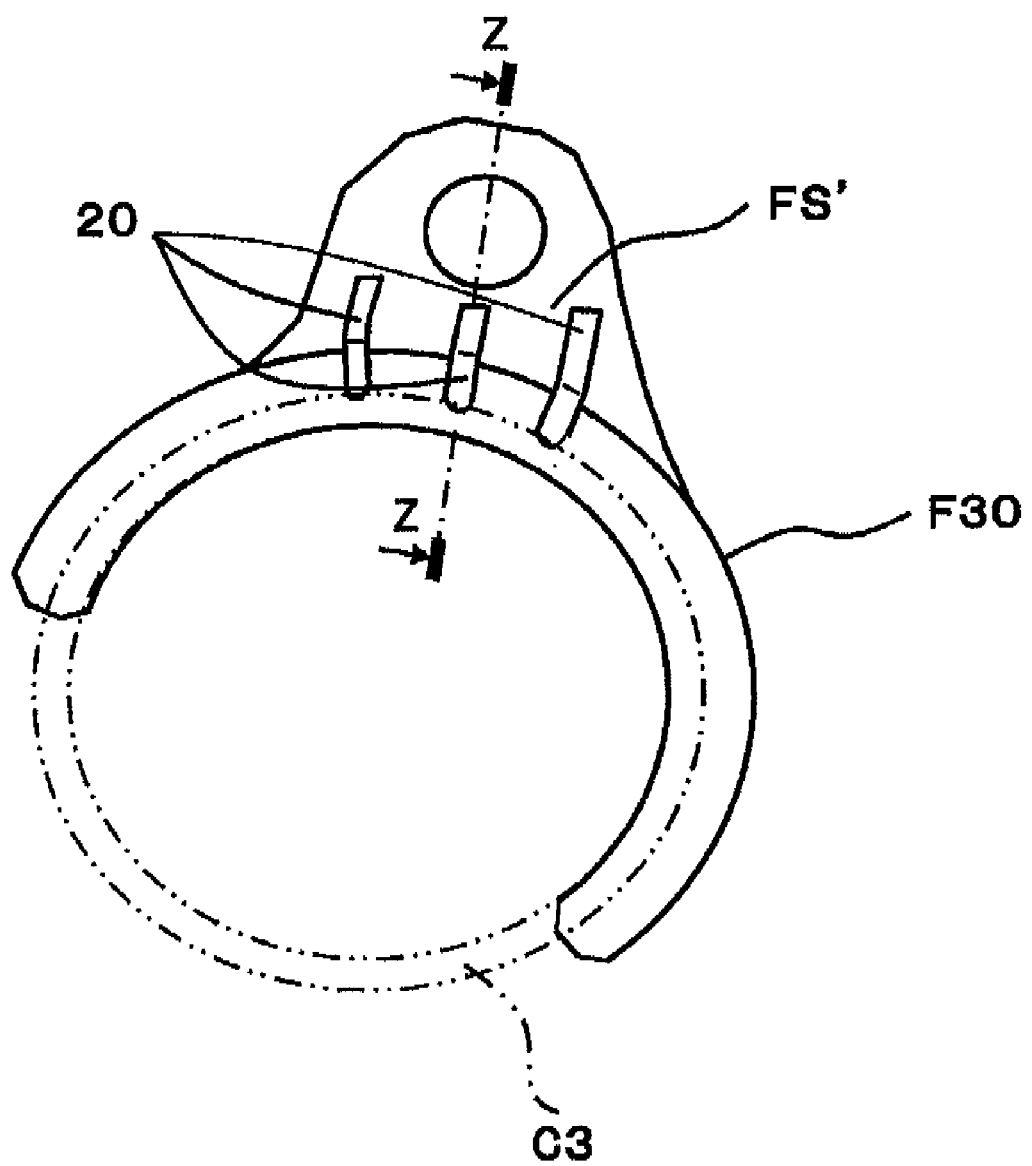
FIG. 8 is a simplified schematic axial end elevational view of a side surface of a shifting fork, as seen from the front side of the transmission in accordance with a second embodiment of the present invention.
Figure 9:
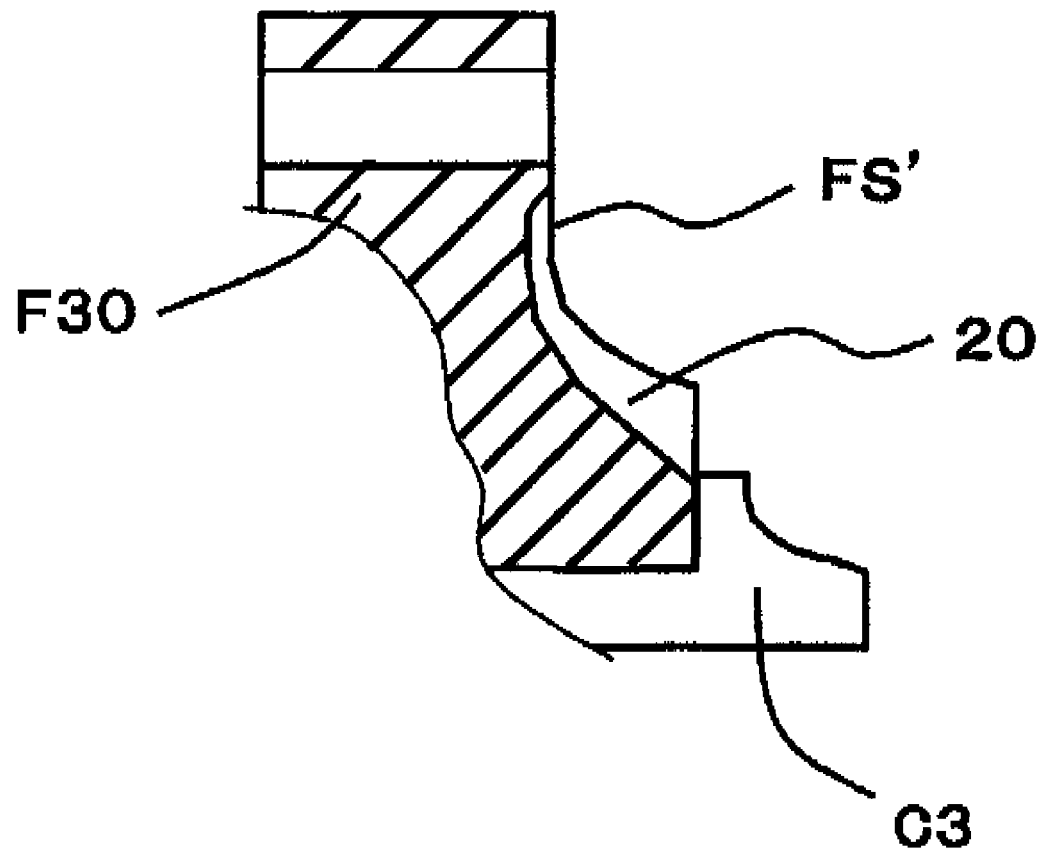
FIG. 9 is a simplified schematic cross sectional view as viewed along section line Z-Z of FIG. 8 in accordance with the second embodiment of the present invention.

Referring now to FIGS. 8 and 9, the shifting fork F3 of the transmission 1 of the first embodiment has been replaced with a shifting fork F30 in accordance with a second embodiment. In other words, the transmission of the second embodiment comprises the same hardware as transmission 1 in the first embodiment, except for changing the shifting fork F3 to the shifting fork F30. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment have been omitted for the sake of brevity. The parts of the second embodiment that differ from the parts of the first embodiment will be indicated with a single prime (').

FIG. 8 a simplified schematic axial end elevational view of a side surface of a shifting fork, as seen from the front side of the transmission, while simplified schematic cross sectional view as viewed along section line Z-Z of FIG. 8. As in the first embodiment, the oil gutter 4 and the oil diverting part 100 directs a portion of the lubricant so that the lubricant hits the side surface FS' of the shifting fork F30. The side surface FS' of the shifting fork F30 is provides with a plurality of lubricant conduits or guide ways 20 that are configured and arranged to guide the lubricant to the $6^{th}$ speed clutch gear CG via the coupling sleeve C3. The lubricant conduits 20 are inclined in a direction to direct the lubricant toward the $6^{th}$ speed clutch gear CG.

Next, the lubricating operation of the lubricant supplying structure of the transmission 1 of this second embodiment will be explained. In particular, the lubricant flow to the $6^{th}$ speed clutch gear CG by the oil gutter 4 will now be explained.

Similar to the first embodiment, the lubricant is scooped up from the bottom area of the transmission 1 by the rotation of the ring gear R of the differential D. Thus, the rotation of the ring gear R conveys the lubricant to the oil inlet part 11 of the oil gutter 4. For example, the lubricant on the ring gear R is propelled by the rotation of the ring gear R to hit the oil spill prevention rib 1b. Accordingly, a part of the lubricant that is received in the oil inlet part 11 is directed to the oil opening 13a by the guide rib 11r. The lubricant exiting from the oil opening 13a is supplied to the bearing B, which supports one end of the output axle 3 to rotate in the transmission case 1a. The remaining the lubricant flows into the oil channel 12 and then directed into the oil opening 13b, 13c and 13d by the guide paths 15a, 15b and 15c.

The lubricant fed from the oil opening 13b is supplied to the meshing surfaces between the $2^{nd}$ speed drive gear G2 and the $2^{nd}$ speed driven gear G2' and the meshing surfaces between the $3^{rd}$ speed drive gear G3 and the $3^{rd}$ speed driven gear G3'. The lubricant fed from the oil opening 13c is supplied to the meshing surfaces between the $4^{th}$ speed drive gear G4 and the $4^{th}$ speed driven gear G4', and the meshing surfaces between the $5^{th}$ speed drive gear G5 and the $5^{th}$ speed driven gear G5'.

The lubricant fed from opening 13d is supplied to the meshing surfaces between the $6^{th}$ speed drive gear G6 and the $6^{th}$ speed driven gear G6' by the inclined surface 100a, along with which, a part of the lubricant is directed to the side surface FS' of the shifting fork F30 by the protrusion 16. Thus, the lubricant hits the side surface FS' that is oriented toward the $6^{th}$ speed clutch gear CG, which is embedded in the side surface of the $6^{th}$ speed drive gear G6. In particular, the lubricant that is directed by the protrusion 16 against the side surface FS' of the shifting fork F30 hits the side surface FS', and then streams down the lubricant conduits 20 onto the outer corner surface of the coupling sleeve C3. The lubricant then flows from the outer corner surface of the coupling sleeve C3 to the $6^{th}$ speed clutch gear CG, which is embedded in the side surface of the $6^{th}$ speed drive gear G6. By using the lubricant conduits 20, the lubricant is successfully supplied to the $6^{th}$ speed clutch gear CG. At this time, some of the lubricant at the meshing surfaces between the $6^{th}$ speed drive gear G6 and the $6^{th}$ speed driven gear G6' splashes against the inclined surface 100b where the lubricant is then directed to the side surface FS' of the shifting fork F30. This arrangement assists the lubricant that is oriented toward the side surface FS' of the shifting fork F30 by the protrusion 16, and the lubricant that spills from the edge surface 100a' of the side surface FS' of the shifting fork F30 of the inclined surface 100a in reaching the side surface FS' of the shifting fork F30. Accordingly, the lubricant is able to be efficiently supplied to the $6^{th}$ speed clutch gear CG.

According to the transmission of the second embodiment, as explained above, operational effects similar to the transmission 1 of the first embodiment. In other words, it is possible to ensure more definitely that the lubricant is supplied to the $6^{th}$ speed clutch gear CG, which is embedded in the side surface of the $6^{th}$ speed drive gear G6. Also the effect of supplying the lubricant to the meshing surfaces of the $6^{th}$ speed drive gear G6 and the $6^{th}$ speed driven gear G6', and the effect of supplying the lubricant efficiently to the $6^{th}$ speed clutch gear CG by using the inclined surface 100b are achieved successfully. In addition, it is possible to supply the lubricant successfully to the $6^{th}$ speed clutch gear CG by the lubricant conduits 20, which are formed on the side surface FS' of the $6^{th}$ speed of the shifting fork F30. In other words, in the transmission of the present invention, it is also possible for the lubricant conduits 20 to be formed on an incline so as to orient the lubricant toward the clutch gear side. In this case, it is possible to ensure more definitely that the clutch gear CG will be supplied with the lubricant supplied to the side surface of the shifting fork F30.

In the transmissions 1 of the first and second embodiments, by directing the lubricant oriented toward the side surface FS or FS' of the shifting fork F3 or F30 using the inclined surface 100b of the oil diverting part 100, which is formed in the transmission case 1a, the lubricant oriented toward the side surface FS or FS' of the shifting fork F3 or F30 by the protrusion 16 and the lubricant spilling out from the edge surface 100a' of the side surface FS or FS' of the shifting fork F3 or F30 on the inclined surface 100a, is supplied to the side surface FS or FS' of the shifting fork F3 or F30. However, it can be preferable to supply the lubricant to the side surface FS or FS' of the shifting fork F3 or F30 using only the protrusion 16 without using the inclined surface 100b of the oil diverting part 100, or to supply the lubricant to the side surface FS or FS' of the shifting fork F3 or F30 using only the inclined surface 100b of the oil diverting part 100.

In the transmissions 1 of the first and second embodiments, while the lubricant from the oil opening 13d is directed toward the side surface FS or FS' of the shifting fork F3 or F30 by the protrusion 16, which is formed as an integral unit with the oil gutter 4, it can be desirable to form the protrusion 16 as a separate unit from the oil gutter 4. Also, it can be preferable to use a part of the transmission case 1a to direct the lubricant fed from the oil opening 13d to the side surface FS or FS' of the shifting forks F3 and F30.

In the transmissions 1 of the first and second embodiments, the lubricant splashed on the meshing surfaces between the $6^{th}$ speed drive gear G6 and the $6^{th}$ speed driven gear G6' is oriented toward the side surface FS or FS' of the shifting fork F3 or F30 by the inclined surface 100b of the oil diverting part 100, which is formed as a unit in the transmission case 1a, but it is desirable to orient the lubricant splashed on the meshing surfaces the $6^{th}$ speed drive gear G6 and the $6^{th}$ speed driven gear G6' to the side surface FS or FS' of the shifting fork F3 or F30. For example, it can be desirable to direct the lubricant that splashed on the meshing surfaces of the $6^{th}$ speed drive gear G6 and the $6^{th}$ speed driven gear G6' to the side surface FS or FS' of the shifting fork F3 or F30 by an orientation board, etc., which is provided separately from the transmission case 1a.

In the transmissions 1 of the first and second embodiments, the $6^{th}$ speed clutch gear CG is embedded in the side surface of the $6^{th}$ speed drive gear G6 and the protrusion 16 is positioned at the oil opening 13d in order to supply the lubricant to the $6^{th}$ speed clutch gear CG. However if the clutch gear is embedded in the side surface of one of the other drive gears (G1, G2, G3, G4, G5), then an oil opening and a protrusion can be provided in the oil channel to supply the lubricant to the meshing surfaces of the corresponding drive gear (G1, G2, G3, G4, G5) and the corresponding driven gear (G1', G2', G3', G4', G5') so that the embedded clutch gear is lubricated.

In the transmissions 1 of the first and second embodiments, the $6^{th}$ speed drive gear G6 is a freely rotating gear, but it can be desirable to make the $6^{th}$ speed driven gear G6' a freely rotating gear. In this case, it should be configured so that the lubricant fed from the opening will supply the lubricant to the clutch gear embedded in the side surface of the driven gear G6' as a freely rotating gear, by forming a protrusion or incline member so as to direct lubricant to the shifting fork that operates the $6^{th}$ speed driven gear G6'.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the transmission of the present invention. Accordingly, these terms, as utilized to describe the present invention should be interpreted relative to a vehicle equipped with the transmission of the present invention.

Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A transmission comprising:
   a rotating shaft;
   a coupling sleeve coupled to the rotating shaft to rotate with the rotating shaft;
   a variable speed gear mounted on the rotating shaft to selectively rotate on the rotating shaft;
   a clutch gear embedded in a side surface of the variable speed gear to selectively engage the coupling sleeve;
   a shifting fork operatively engagable with an outer peripheral area of the coupling sleeve to move the coupling sleeve in an axial direction of the rotating shaft to selectively engage the coupling sleeve with the clutch gear with a part of the coupling sleeve being axially inserted into the variable speed gear; and
   a lubricant supplying structure including a lubricant guiding surface configured and arranged to direct lubricant to the clutch gear by diverting the lubricant against a side surface of the shifting fork that faces the clutch gear and the coupling sleeve, the lubricant guiding surface at least partially overlaps the shifting fork when viewed in the axial direction.

2. The transmission according to claim 1, wherein the lubricant supplying structure includes an oil gutter configured and arranged to direct a part of the lubricant, which is supplied to a meshing surface, to the side surface of the shifting fork.

3. The transmission according to claim 2, wherein the lubricant supplying structure further includes a first orientation member configured and arranged to direct a part of the lubricant, which is supplied to the meshing surface, to the side surface of the shifting fork.

4. The transmission according to claim 3, wherein the lubricant supplying structure further includes a second orientation member configured and arranged to direct a part of the lubricant, which is scooped up by rotation of the variable speed gear, to the side surface of the shifting fork.

5. The transmission according to claim 4, wherein the first and second orientation members are configured to cooperate together to direct a part of the lubricant to the side surface of the shifting fork.

6. The transmission according to claim 5, wherein the first and second orientation members are configured and arranged relative to each other such that the lubricant directed by the second orientation member towards the side surface of the shifting fork aids in directing the lubricant from the first orientation member towards the side surface of the shifting fork.

7. The transmission according to claim 1, wherein the lubricant supplying structure further includes an orientation member configured and arranged to direct a part of the lubricant, which is scooped up by rotation of the variable speed gear, to the side surface of the shifting fork.

8. The transmission according to claim 7, wherein the orientation member is formed by a part of a transmission case.

9. The transmission according to claim 2, wherein the lubricant supplying structure further includes a guiding member configured and arranged to direct the lubricant, which is scooped up by rotation of a differential gear, to the oil gutter.

10. The transmission according to claim 9, wherein the guiding member includes a rib formed by a part of a transmission case.

11. The transmission according to claim 2, wherein the oil gutter has a channel width that becomes narrower in a downstream direction.

12. The transmission according to claim 1, wherein the side surface of the shifting fork includes a lubricant channel configured and arranged to direct a part of the lubricant, which has been directed against the side surface of the shifting fork by lubricant supplying structure, to the clutch gear.

13. The transmission according to claim 12, wherein the lubricant channel is inclined relative to the axial direction of the rotating shaft so as to direct the lubricant along a path toward a side surface of the clutch gear that faces the side surface of the shifting fork.

14. The transmission according to claim 1, wherein the coupling sleeve includes a tapered section having a radius that becomes smaller as the tapered section approaches an end portion of the outer peripheral surface of the coupling sleeve, and the end portion faces the clutch gear side.

15. The transmission according to claim 1, wherein the coupling sleeve including a spline formed on an inner surface that meshes with the clutch gear.

* * * * *